(12) United States Patent
Seigel (10) Patent No.: US 9,792,169 B2
(45) Date of Patent: Oct. 17, 2017

(54) MANAGING ALERT PROFILES

(71) Applicant: Dell Products L.P., Round Rock, TX (US)

(72) Inventor: Jake Seigel, Halifax (CA)

(73) Assignee: QUEST SOFTWARE INC., Aliso Viejo, CA (US)

( * ) Notice: Subject to any disclaimer, the term of this patent is extended or adjusted under 35 U.S.C. 154(b) by 103 days.

(21) Appl. No.: 14/812,823

(22) Filed: Jul. 29, 2015

(65) Prior Publication Data

US 2017/0031741 A1    Feb. 2, 2017

(51) Int. Cl.
    *G06F 11/00*    (2006.01)
    *G06F 11/07*    (2006.01)
    *G06N 99/00*    (2010.01)

(52) U.S. Cl.
    CPC ........ *G06F 11/079* (2013.01); *G06F 11/0751* (2013.01); *G06F 11/0772* (2013.01); *G06F 11/0787* (2013.01); *G06N 99/005* (2013.01)

(58) Field of Classification Search
    CPC .............. G06F 11/079; G06F 11/0787; G06F 11/0772; G06F 11/0751; G06N 99/005
    USPC ......................................................... 714/26
    See application file for complete search history.

(56) References Cited

U.S. PATENT DOCUMENTS

| | | | |
|---|---|---|---|
| 2004/0193943 A1* | 9/2004 | Angelino | H04L 63/1408 714/4.1 |
| 2014/0006862 A1* | 1/2014 | Jain | G06F 11/0736 714/26 |
| 2015/0195154 A1* | 7/2015 | Hevizi | H04L 43/024 706/50 |
| 2017/0093664 A1* | 3/2017 | Lynam | H04L 43/06 |
| 2017/0102997 A1* | 4/2017 | Purushothaman | G06F 11/1415 |

\* cited by examiner

*Primary Examiner* — Yair Leibovich
(74) *Attorney, Agent, or Firm* — Maschoff Brennan (57) ABSTRACT

Systems and techniques for managing alert profiles, including creating the alert profiles and deactivating the alert profiles, are described. Auditing software executing on a central server may receive an event log from a software agent. The event log may identify activities associated with a network element in a computer system. The auditing software may include a classifier trained using machine learning. The auditing software may determine that the event log is indicative of an interesting activity, such as malicious activity. The auditing software may create an alert profile. The auditing software may assign a severity to the alert profile. The auditing software may determine whether the alert profile is relevant. The auditing software may deactivate the alert profile based on determining that the alert profile is not relevant.

20 Claims, 7 Drawing Sheets

MANAGING ALERT PROFILES

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An auditing system may monitor event logs generated in a computer system and enable a user (e.g., a system administrator) to manually create one or more alert profiles. An alert profile may include a set of conditions (e.g., event logs occurring within a predetermined period of time) and one or more actions to perform (e.g., raise an alert, send an alert notification message, etc.) when the conditions are satisfied. For example, if the auditing system determines that the conditions of a particular alert profile are satisfied (e.g., one or more event logs occur within a predetermined period of time), then the auditing system may perform the one or more actions (e.g., raising an alert) specified in the particular alert profile. However, with large and complex computer systems, alert profiles that were relevant during a particular period of time may become irrelevant. For example, as a computing system grows and evolves, an alert profile that was relevant when the computing system was a particular size and handled a particular amount of traffic may be irrelevant after the computing system has grown to a larger size or is handling a larger amount of traffic. The irrelevant alert profiles may continue to raise alerts (or perform other actions) even though the alerts are no longer relevant, resulting in the alerts becoming "background noise" that is ignored.

SUMMARY

This Summary provides a simplified form of concepts that are further described below in the Detailed Description. This Summary is not intended to identify key or essential features and should therefore not be used for determining or limiting the scope of the claimed subject matter.

Systems and techniques for managing alert profiles, including creating the alert profiles and deactivating the alert profiles, are described. Auditing software executing on a central server may receive an event log from a software agent. The event log may identify activities associated with a network element in a computer system. The auditing software may include a classifier trained using machine learning. The auditing software may determine that the event log is indicative of an interesting activity. An interesting activity may be defined by a system administrator, determined using machine learning, or both. An interesting activity may include one or more event logs that are currently of interest, such as event logs that may be indicative of malicious activity (e.g., failed login attempts, accessing restricted resources, or the like), event logs that may be indicative of resource under-utilization, event logs that may be indicative of a resource that is at or near maximum utilization, a particular type of event logs (e.g., event logs indicating attempts to gain access to a computer system, event logs indicating mass copying of records in a database, etc.), another type of activity that is determined to be of interest, or any combination thereof. The auditing software may create an alert profile. The auditing software may assign a severity to the alert profile. The auditing software may determine whether the alert profile is relevant. The auditing software may deactivate the alert profile based on determining that the alert profile is not relevant.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Systems and techniques (e.g., auditing systems and software) are described herein to monitor (e.g., in real time) event logs generated by multiple agents, determine when an event log is interesting, and create an alert profile associated with the event log. An alert profile may be used to draw attention to a set of one or more event logs that have occurred. When conditions associated with the alert profile are satisfied, one or more actions may be performed. The system and techniques may determine when an alert profile is no longer relevant and deactivate (e.g., retain the alert profile for future analysis) or delete the alert profile. For example, in a computing system of a company (e.g., an enterprise computing system), users may, during a normal work day, login to a user device (e.g., a workstation, a laptop, a tablet, or other computing device) and access one or two particular databases and one or two particular servers. An alert profile may be created to perform one or more actions when a user identifier is used to attempt to access more than two databases or more than two servers within a particular period of time (e.g., within a two hour time period, within the same day, or the like). For example, the alert profile may specify that when a user identifier is used to attempt to access more than two databases or access more than two servers within a particular period of time, one or more actions are to be performed. The one or more actions may include notifying a particular user (e.g., system administrator), temporarily denying the user identifier access to predetermined set of resources, temporarily denying the user identifier access to all resources, using a camera (e.g., webcam) connected to a computing device to take a picture of a user that is using the user identifier, logging the keystrokes entered by the user, another action, or any combination thereof. The systems and techniques described herein may be used to determine when the alert profile is no longer relevant and to deactivate (or delete) the alert profile. For example, due to a change in circumstances (e.g., a corporate restructuring etc.), the responsibilities of one or more individuals may be modified such that the individuals access more than two databases or access more than two servers within the particular period of time. The systems and techniques may be used to deactivate (or delete) the alert profile and create a new alert profile based on data gathered after the circumstances have changed. While many of the examples described herein are related to creating alert profiles to identify malicious activity, the systems and techniques described herein may also be used to optimize a computer system by identifying bottlenecks, resources that are being under-utilized or over-utilized (e.g., at or near maximum capacity), and other system-related activities.

Alert profiles may be temporary because after an alert profile has been created, the systems and techniques described herein may monitor event logs to determine whether the alert profile is relevant, and the alert profile may be deactivated (or deleted) when the alert profile is no longer relevant. The alert profile may be created by a human or created by a classifier (e.g., trained using machine learning) performing an analysis of gathered event logs in an enterprise or other large computing system. An alert profile may thus be temporary and may expire after a predetermined amount of time, or a classifier (e.g., trained using machine learning) may be used to determine when the alert profile is no longer relevant. For example, alert profiles may be automatically created based on anomalous event logs and set to expire after a predetermined period of time that is determined based on an analysis of previous incidents or based on a set of predefined options.

A classifier trained using machine learning techniques may be used to decide whether or not a particular alert profile should be retained. In some cases, after a classifier (e.g., machine learning algorithm) has been used to analyze event log data and create an alert profile, a system administrator may assign a severity (or priority) and may determine when the alert profile expires based on the severity (or priority). For example, a high severity alert profile may expire after a longer period of time than a lower severity alert profile. Thus, creating temporary alert profiles avoids situations in which alert profiles are created due to a temporary situation and then remain active despite the fact that the temporary situation is no longer relevant. The alert profiles may be made temporary by assigning a predetermined time period (e.g., after which the alert profile expires) or by repeatedly (e.g., at predetermined intervals, after a predetermined number of event logs have been received, etc.) determining whether the alert profile is relevant. For example, when an employee account is compromised and malicious software runs on a few servers, an administrator may create a first alert profile to monitor a particular user account, a second alert profile to monitor the affected servers, etc. The multiple alert profiles may be intended to detect strange behavior, but after the malware has been removed and the user account secured, alerts may continue to be generated by legitimate usage that is just outside the range of normal usage. Such alerts may be considered "noise" as they cause an alert to be generated by legitimate usage and can therefore be ignored.

Thus, auditing software (e.g., Dell™ Change Auditor) may receive event logs that are generated in a computing system. For example, the auditing software may, in real time, generate audits, alerts and reports on changes and deletions made to, Active Directory™, Exchange®, SharePoin®, VMware™, EMC™, NetApp™, SQL Server™, Windows® file servers, lightweight directory access protocol (LDAP) queries against Active Directory etc. The auditing software may use a classifier (e.g., trained using machine learning) to create an alert profile. When conditions associated with the alert profile are satisfied, the auditing software may cause one or more actions to be performed. For example, after the auditing software determines that a particular set of event logs were received within a predetermined period of time, the auditing software may determine that the conditions associated with the alert profile have been satisfied, and cause one or more actions (e.g., sending an alert message to a system administrator) to be performed. The alert profile may be temporary. For example, the alert profile may be automatically deactivated or deleted after a predetermined period of time. As another example, the auditing software may analyze event logs that are received and deactivate or delete an alert profile after determining that the alert profile is not relevant. By doing so, fewer alert profiles may be active at any one time, thereby using less computing resources and network bandwidth. In addition, by periodically determining that active alerts are relevant, security may be improved.

Figure 1:
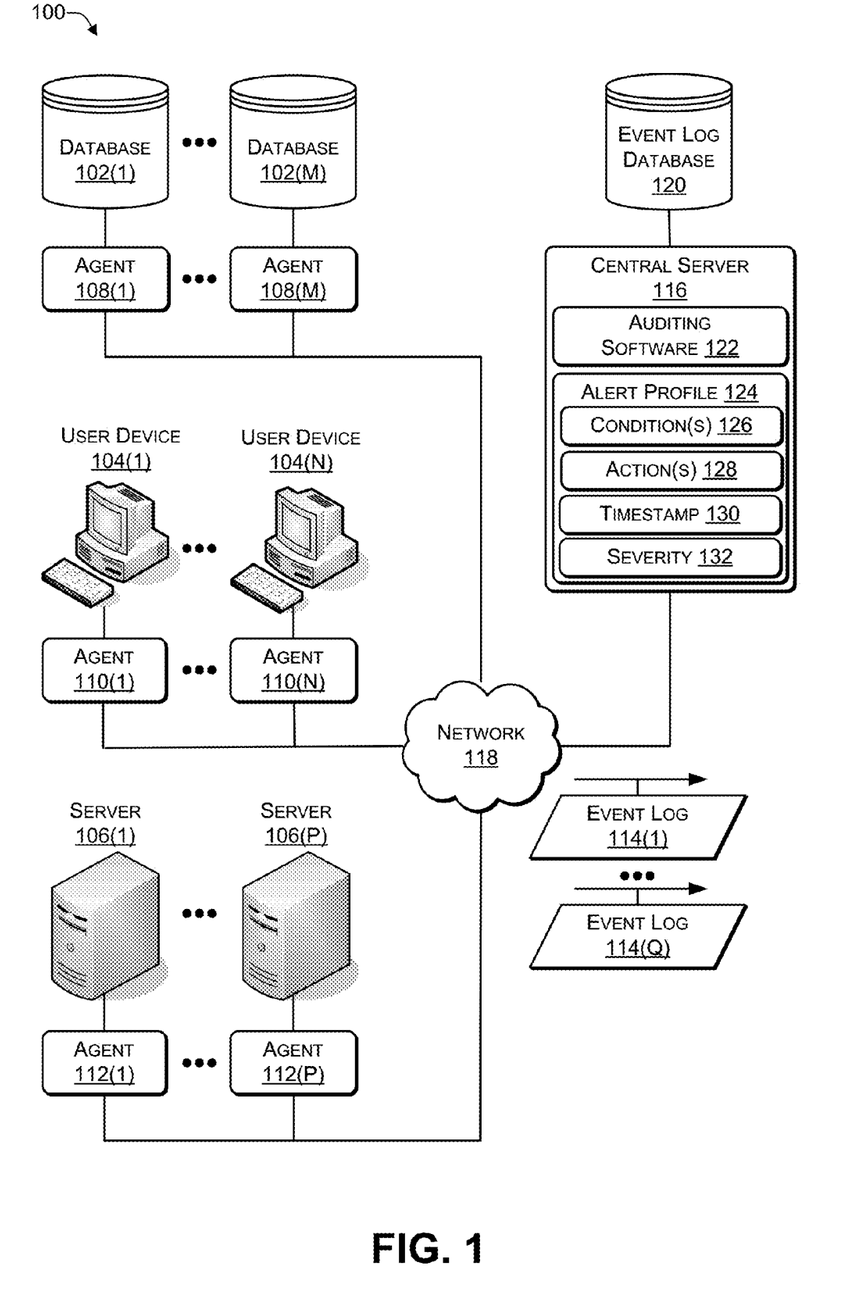
FIG. 1 is a block diagram illustrating a computing system that includes auditing software to monitor event logs according to some embodiments.

FIG. 1 is a block diagram illustrating a computing system 100 that includes auditing software to monitor event logs according to some embodiments. The computing system 100 may include multiple types of network element, including a representative one or more databases, such as a database 102(1) to a database 102(M), a representative one or more user devices, such as a user device 104(1) to a user device 104(N), and a representative one or more servers, such as a server 106(1) to a server 106(P), where M>1, N>1, and P>1, and where M, N, and P are not necessarily the same. Of course, the computing system 100 may include other network elements besides the databases 102, the user devices 104, and the servers 106. The user devices 104 may include workstations, laptops, tablets, wireless phones, other types of computing devices used to access other network elements of the computing system 100, or any combination thereof.

The network elements of the computing system 100 may have an associated agent that monitors a particular component and generates an event log, such as one of event logs 114(1) to 114(Q) (where Q>1), when an event occurs. For example, each of the agents 108(1) to 108(M) may be associated with a particular one of the databases 102(1) to 102(M) (e.g., the agent 108(1) may be associated with the database 102(1) and the agent 108(M) may be associated with the database 102(M)). The agents 108 may monitor the databases 102 and generate one of the event logs 114 when a particular event occurs. For example, the agents 108 may generate an event log each time one of the databases 102 is modified, e.g., each time (i) data is added to one of the databases 102, (ii) deleted from one of the databases 102, or (iii) changed in one of the databases 102.

Each of agents 110(1) to 110(N) may be associated with a particular one of the user devices 104(1) to 104(N) (e.g., the agent 110(1) may be associated with the user device 104(1) and the agent 110(N) may be associated with the user device 104(N)). The agents 110 may monitor the user devices 104 and generate one of the event logs 114 when a particular event occurs. For example, the agents 110 may generate an event log each time a login occurs on one of the user devices 104, each time of the user devices 104 is used to access one of the databases 102 or one of the servers 106, etc.

Each of agents 112(1) to 112(P) may be associated with a particular one of the servers 106(1) to 106(P) (e.g., the agent 112(1) may be associated with the server 106(1) and the agent 112(P) may be associated with the server 106(P)). The agents 110 may monitor the servers 106 and generate one of the event logs 114 when a particular event occurs. For example, the agents 112 may generate an event log each time one of the servers 106 is accessed.

A central server 116 may receive the event logs 114(1) to 114(Q) from one or more of the agents 108, 110, or 112 via a network 118. The central server 116 may store at least a portion of the event logs 114 in a database, such as an event log database 120. For example, the central server 116 may store a portion of the events logs 114 that are classified as sufficiently important to be stored. As another example, each of the event logs 114 may be assigned a priority and deleted from the database at a predetermined time based on the priority. For example, low priority event logs may be deleted from the event log database 120 after a relatively short time while higher priority event logs may not be deleted from the event log database 120 or may be deleted after a much longer period of time.

The central server 116 may include one or more processors and one or more computer readable storage media to store auditing software 122. The auditing software 122 may be executed by the one or more processors of the central server 116 to perform various functions. For example, the auditing software 122 may receive and analyze the event logs 114, analyze events stored in the event log database 120, determine when to create a representative alert profile 124, automatically create the alert profile 124, determine when one or more conditions 126 of the alert profile 124 have been satisfied, perform one or more actions 128 associated with the alert profile 124 when the conditions 126 have been satisfied, determine whether alert profile 124 is relevant, delete the alert profile 124 when the alert profile 124 is determined to be irrelevant, perform other functions as described herein, or any combination thereof. The auditing software 122 may perform many functions, such as receiving and analyzing the event logs 114, in real-time. The auditing software 122 may include a classifier trained using a machine learning algorithm to perform at least some of the functions described herein. While the representative alert profile 124 is illustrated in FIG. 1, it should be understood that multiple alert profiles may be created. For example, the central server 116 may store hundreds or even thousands of alert profiles.

The agents 108, 110, and 112 may monitor activities (e.g., events) occurring at network elements (e.g., components) of the network 118, such as the databases 102, the user devices 104, and the servers 106. For example, the agents 108 may monitor actions performed on the databases 102, including actions such as reading data from the databases 102, writing data to the databases 102, modifying data stored in the databases 102, deleting data stored in the databases 102, etc. The agents 108 may monitor which action(s) are being performed to the databases 102, to which of the databases 102(1) to 102(M) the action is being performed, a user identifier (or process identifier) that is initiating the action, how many actions are being performed in a predetermined period of time, etc.

The agents 110 may monitor activities associated with the user devices 104, such as user identifiers used to login to each of the user devices 104, which network elements (e.g., other user devices 104, the databases 102, or the servers 106) are accessed by each of the user devices 104, an amount of data sent from each of the user devices 104, an amount of data received by each of the user devices 104, etc.

The agents 112 may monitor activities associated with the servers 106, such as how each of the servers 106 is being accessed, which network elements (e.g. the user devices 104) are accessing each of the servers 106, a number of transactions received by each of the servers 106, a number of transactions sent by each of the servers 106, a number of transactions processed by each of the servers 106, etc.

The agents 108, 110, and 112 may generate the event logs 114(1) to 114(Q) (where Q>1) based on monitoring the activities of the databases 102, the user devices 104, or the servers 106, respectively. Each of the event logs 114 may be associated with one or more activities. For example, the event log 114(1) may be associated with the occurrence of a single activity and the event log 114(Q) may be associated with the occurrence of more than one activity. To illustrate, one of the event logs 114 may be generated each time data stored in one of the databases 102 is accessed.

Each of the event logs 114 may be generated based on detecting one or more activities. At least a portion of the event logs 114 may be generated in response to detecting activities that are indicative of malicious activities performed by malware or by an unauthorized user. For example, the agent 108(M) may generate the event log 114(Q) in response to determining that more than a threshold number of attempts were made to access the database 102(M) using incorrect credentials. The agent 108(M) may generate the event log 114(Q) in response to determining that more than a threshold number of actions were performed by the agent 110(N) to the database 102(M) within a predetermined period of time. For example, the event log 114(Q) may be generated when the agent 110(N) performs 100 (or more) transactions to the database 102(M) within a five minute time period because such activity may be indicative of malicious activity performed by malware or by an unauthorized user. The agent 110(N) may generate the event log 114(Q) in response to determining that more than a threshold number of attempts were made to login to one (or more) of the user devices 104(1) to 104(N) within a predetermined period of time using incorrect credentials. The agent 110(N) may generate the event log 114(Q) in response to determining that more than a threshold number of transactions were initiated within a predetermined period of time by the user device 104(N). For example, the agent 110(N) may generate the event log 114(Q) in response to determining that more than 100 transactions were initiated within a five minute time period by the user device 104(N) because such activity may be indicative of malicious activity performed by malware or by an unauthorized user. The agent 112(P) may generate the event log 114(Q) in response to determining that more than a threshold number of transactions were initiated by the server 106(P) within a predetermined period of time. Thus, the agents 108, 110, and 112 may generate the event logs 114 based on detecting activities that are indicative of malicious activity.

The conditions (e.g., X number of transactions performed within Y seconds, where X>0 and Y>0) that cause the event logs 114 to be generated may be defined by a system administrator, determined using a classifier (e.g., trained using machine learning), or a combination of both, e.g., determined using a classifier and then adjusted by the system administrator.

The auditing software 122 may receive the event logs 114 from one or more of the agents 108, 110, or 112. In some cases, the auditing software 122 may receive the event logs 114 and determine which of the event logs 114 to store (e.g., archive) in the event log database 120. For example, a portion of the event logs 114 may be stored in the event log database 120 while a remainder of the event logs 114 may not be stored in the event log database 120. In some cases, the auditing software 122 may receive the event logs 114, assign a priority (or severity) to each of the events logs 114, and store the event logs 114 in the event log database 120. The priority (or severity) may determine which event logs are analyzed (e.g., using a classifier trained using machine learning). For example, high priority logs may be used to perform an analysis to identify malicious activity while low priority logs may not be included when performing the analysis. To illustrate, an event log of a successful login on one of the user devices 104 may be assigned a low severity and, in some cases, ignored when performing the analysis while event logs of unsuccessful login attempts may be assigned a higher severity and may be included when performing the analysis.

The auditing software 122 may perform an analysis (e.g., using a classifier) of the event logs 114(1) to 114(Q), at least a portion of the event logs stored in the event log database 120, or a combination of both. Based on the analysis, the auditing software 122 may create one (or more) alert profiles, such as the representative alert profile 124. The alert profile 124 may include the conditions 126 and the actions 128. The conditions 126 may specify conditions, such as a set of (e.g., one or more) events, whose occurrence triggers (e.g., causes) the actions 128 to be performed. For example, the event log 114(1) may indicate that multiple logins were attempted at the user device 104(1) within a first predetermined period of time and that the last login attempt was successful but that the previous login attempts were unsuccessful. The event log 114(Q) may indicate that the user device 104(1) initiated at least a predetermined number of transactions to the database 102(1) within a second predetermined period of time. Individually, the event logs 114(1) and 114(Q) may not cause the conditions 126 of the alert profile 124 to be satisfied. However, when the event logs 114(1) and 114(Q) are generated within a third predetermined period of time that is specified in the conditions 126, the conditions 126 may be satisfied. For example, if the event log 114(Q) is generated more than one hour after the event log 114(1) is generated, then the auditing software 122 may determine that the conditions 126 are not satisfied. However, if the event log 114(Q) is generated less than one hour after the event log 114(1) is generated, then the auditing software 122 may determine that the conditions 126 are satisfied and may perform the actions 128.

The auditing software 122 may automatically (e.g., without human interaction) perform the actions 128 in response to determining that the conditions 126 have been satisfied. The actions 128 may include sending an alert message to a system administrator, locking a particular user out of the computer system 100 (e.g., logging out the user and preventing the user from logging back in), disabling (or restricting) access to one or more of the user devices 104, disabling (or restricting) access to one or more of the databases 102, disabling (or restricting) access to one or more of the servers 106, deleting (or restricting access to) data stored on one or more of the databases 102, the user devices 104, or the servers 106, other actions to prevent malicious activity from continuing, or any combination thereof.

The alert profile 124 may include a timestamp 130. Depending on the implementation, the timestamp 130 may be used in several different ways. For example, the timestamp 130 may indicate when the alert profile 124 was created. The alert profile 124 may automatically expire after a predetermined period of time has elapsed. The auditing software 122 may periodically determine a difference between a current time and the timestamp 130. If the auditing software 122 determines that the difference between the current time and the timestamp 130 is greater than or equal to the expiry time period, the auditing software 122 may automatically (e.g., without human interaction) deactivate or delete the alert profile 124.

As another example, the timestamp 130 may indicate when the alert profile 124 is set to expire. When the auditing software 122 creates the alert profile 124, the auditing software 122 may assign (e.g., using a classifier) a severity 132 (or priority) to the alert profile 124, determine how long the alert profile 124 should remain in effect, and then create the timestamp 130 accordingly. For example, when the auditing software 122 creates the alert profile 124, the auditing software 122 may create the timestamp 130 by adding X hours (e.g., X>0) to a current time, thereby setting the alert profile 124 to expire after X hours. The auditing software 122 may periodically determine whether the alert profile 124 has expired and deactivate or delete the alert profile 124 after determining that the alert profile 124 has expired.

As a further example, the timestamp 130 may be used to determine how long the alert profile 124 is to remain active. The timestamp 130 may indicate when the alert profile 124 is created and (i) the auditing software 122 may use a classifier (e.g., trained using machine learning) to determine when the alert profile 124 is no longer relevant to deactivate (or delete) the alert profile 124. When the auditing software 122 determines that the alert profile 124 is no longer relevant and deactivates (or deletes) the alert profile 124, the auditing software 122 may use the timestamp 130 to determine a length of time that the alert profile 124 was active. The auditing software 122 may use the length of time that the alert profile 124 was active to determine an average length of time associated with multiple alert profiles. The auditing software 122 may determine an expiration time period for a next alert profile based on the average length of time. To illustrate, the auditing software 122 may use a classifier (e.g., trained using machine learning) to determine when the alert profile 124 is no longer relevant to deactivate (or delete) the alert profile 124. The auditing software 122 may determine how long multiple alert profiles, including the alert profile 124, were active (e.g., using the timestamp 130). The auditing software 122 may determine that Y hours (where Y>0) is the average time that an alert profile is active and set a next alert profile to expire after Y hours. In some cases, if alert profiles have an associated severity, the average length of time that an alert profile is active may be determined for each severity. For a next alert profile, a severity of the next alert profile may be determined, and the next alert profile may be set to expire based on the severity. For example, a high severity alert profile may have an expiry time that is longer (e.g., twice as long, three times as long, or the like) as compared to a lower severity alert profile. To illustrate, an event log associated with a successful login may have a low severity whereas an event log associated with unsuccessful login attempts may have a higher severity. In some cases, the severity 132 may be determined based on a number of the unsuccessful login attempts, e.g., an event log associated with four unsuccessful login attempts may have a higher severity than an event log associated with two unsuccessful login attempts.

The severity 132 may be an integer, a real number, etc. For example, a simple severity scheme from 1 to 3 may use high severity (e.g., "3"), medium severity (e.g., "2"), and low severity (e.g., "1"). To illustrate, one failed login attempt may be assigned a low severity whereas multiple failed login attempts on multiple user devices within a predetermined period of time may be assigned a high severity. Of course, the severity scheme may be expanded, such as having high severity as "10" and low severity as "1" etc. The severity associated with a particular alert profile or with a particular event log may be determined by a classifier trained using machine learning, by a system administrator, or both. For example, a classifier algorithm used by the auditing software 122 may be trained using machine learning to associate a particular severity with a particular type of event log, associate a particular severity with a particular type of alert profile, etc. For example, the auditing software 122 may receive an event log indicating several failed login attempts on a single user device and create an alert profile with a low severity, e.g., the severity 132=1. The auditing software 122 may receive an event log indicating several failed login attempts on each user device of multiple user devices, indicating systematic attempts to gain access to the computer system 100, and create an alert profile with a high severity, e.g., the severity 132=3. The severity 132 may be multiplied by a pre-determined alert profile time interval (e.g., determined by a classifier using machine learning) to determine how long a particular alert profile is to remain active (e.g., to determine the timestamp 130). In this example, a high severity (severity 132=3) event log may be set to be active for about three times as long as a low priority (severity 132=1) and a medium severity (severity 132=2) event log may be set to be active for about two times as long as a low priority (severity 132=1) event log. In some cases, the central server 116 may not determine whether the alert profile 124 is relevant until after the timestamp 130 indicates that the alert profile 124 has expired (e.g., the length of time determined by multiplying the severity 132 by the pre-determined alert profile time interval has passed). In other cases, the central server 116 may determine whether the alert profile 124 is relevant even when the timestamp 130 indicates that the alert profile 124 has not expired (e.g., the length of time determined by multiplying the severity 132 by the pre-determined alert profile time interval has not yet passed).

Of course, the auditing software 122 may determine that the alert profile 124 is no longer relevant and deactivate (or delete) the alert profile 124 regardless of whether the timestamp 130 is used or not. For example, in some implementations, the timestamp 130 may not be used, and the auditing software 122 may determine when the alert profile 124 is no longer relevant and deactivate (or delete) the alert profile 124. As another example, the timestamp 130 may be used to set a time when the alert profile 124 expires (e.g., when the alert profile 124 is to be deactivated or deleted), and if the auditing software 122 determines that the alert profile 124 is no longer relevant prior to the expiration date, the auditing software 122 may deactivate (or delete) the alert profile 124. Thus, the timestamp 130 may be used to determine a maximum amount of time that the alert profile 124 is active and the auditing software 122 may deactivate (or delete) the alert profile 124 at an earlier time using a classifier (e.g., trained using machine learning). To illustrate, the timestamp 130 may be set such that the alert profile 124 is set to expire X days (where X>0) after the alert profile 124 is created. The auditing software 122 may use machine learning techniques to determine that the alert profile 124 is no longer relevant and deactivate (or delete) the alert profile 124 before X days have passed.

If the alert profile 124 is deactivated, the alert profile 124 may be archived and the archived multiple alert profiles may be used to further refine the machine learning techniques used by the auditing software 122. For example, an analysis of archived multiple alert profiles may be used to determine which alert profiles were effective to identify or stop malicious activity, which conditions were effective to identify malicious activity, which actions were effective to stop malicious activity, how long an alert profile should be active in order to be effective, etc. In addition, if the auditing software 122 performs an analysis of the archived alert profiles and determines that the alert profile 124 is created frequently (e.g., with greater than a predetermined frequency), then the alert profile 124 may be made permanent and may not be deleted.

Thus, in the computing system 100, the agents 108, 110, and 112 may monitor activities associated with various network elements, such as the databases 102, the user devices 104, and the servers 106. The agents 108, 110, 112 may generate the one or more event logs 114 based on monitoring the activities. Each of the event logs 114 may be associated with one (or more) activities. The event logs 114 may be sent to the central server 116 and stored in the event log database 120. The auditing software 122 may periodically (or in response to a triggering event log 114) perform an analysis of the event logs 114, contents of the event log database 120, or both. For example, the event log 114(1) may indicate suspicious activity and cause the auditing software 122 to perform an analysis of the contents of the event log database 120, an analysis of the event logs 114(1) to 114(Q), or both. The auditing software 122 may use the analysis to determine whether to create an alert profile, such as the representative alert profile 124. The alert profile 124 may be set to automatically expire after a predetermined period of time, the auditing software 122 may use machine learning to determine when the alert profile 124 is no longer relevant, or both (e.g., the auditing software 122 may use machine learning to determine when the alert profile 124 is no longer relevant and deactivate (or delete) the alert profile 124 prior to the predetermined period of time). Deactivated alert profiles may be archived and analyzed to further refine the machine learning techniques. Alert profiles, such as the representative alert profile 124, may be used for a variety of purposes, including identifying malicious activity, preventing malicious activity from taking place, logging malicious activity and undoing the effects of the malicious activity, identifying ways to optimize (e.g., improve the operations of) the computer system 100, other activities related to the computer-system 100, or any combination therefore. For example, the alert profile 124 may be used to monitor and determine whether one or more of the databases 102, the user devices 104, or the servers 106 are being over-utilized (e.g., at or near maximum capacity) or under-utilized, where bottlenecks in the system 100 are occurring, etc. To illustrate, the alert profile 124 may monitor the databases 102 to identify when transaction throughput begins to decline, e.g., indicating that one of the databases 102 is nearly full (e.g., at or near full capacity, indicating that a new database is to be added, indicating that an existing database's capacity is to be increased, and the like. The alert profile 124 may be used to monitor and identify which of the user devices 104 are prone to being hacked, whether the user devices 104 are being over-utilized (e.g., more than a threshold number of users logging in to the same user device) and whether to add a new user device, whether the user devices 104 are being under-utilized (e.g., at least one of the user devices 104 is never used or used less than a threshold number of times in a particular time period) and whether to remove one or more of the user devices 104, and the like. The alert profile 124 may be used to monitor and identify which of the servers 106 are prone to being hacked (e.g., server 106(P) is hacked at least once a month), whether the servers 106 are being over-utilized (e.g., transaction throughput is at or near full capacity) and whether to add a new server, whether the servers 106 are being under-utilized (e.g., a number of transactions processed in a particular time period falls below a predetermined threshold) and whether to remove one or more of the servers 106, etc.

In the flow diagrams of FIGS. 2, 3, 4, 5, and 6, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 200, 300, 400, 500, and 600 are described with reference to FIG. 1, as described above, although other models, frameworks, systems and environments may implement these processes.

Figure 2:
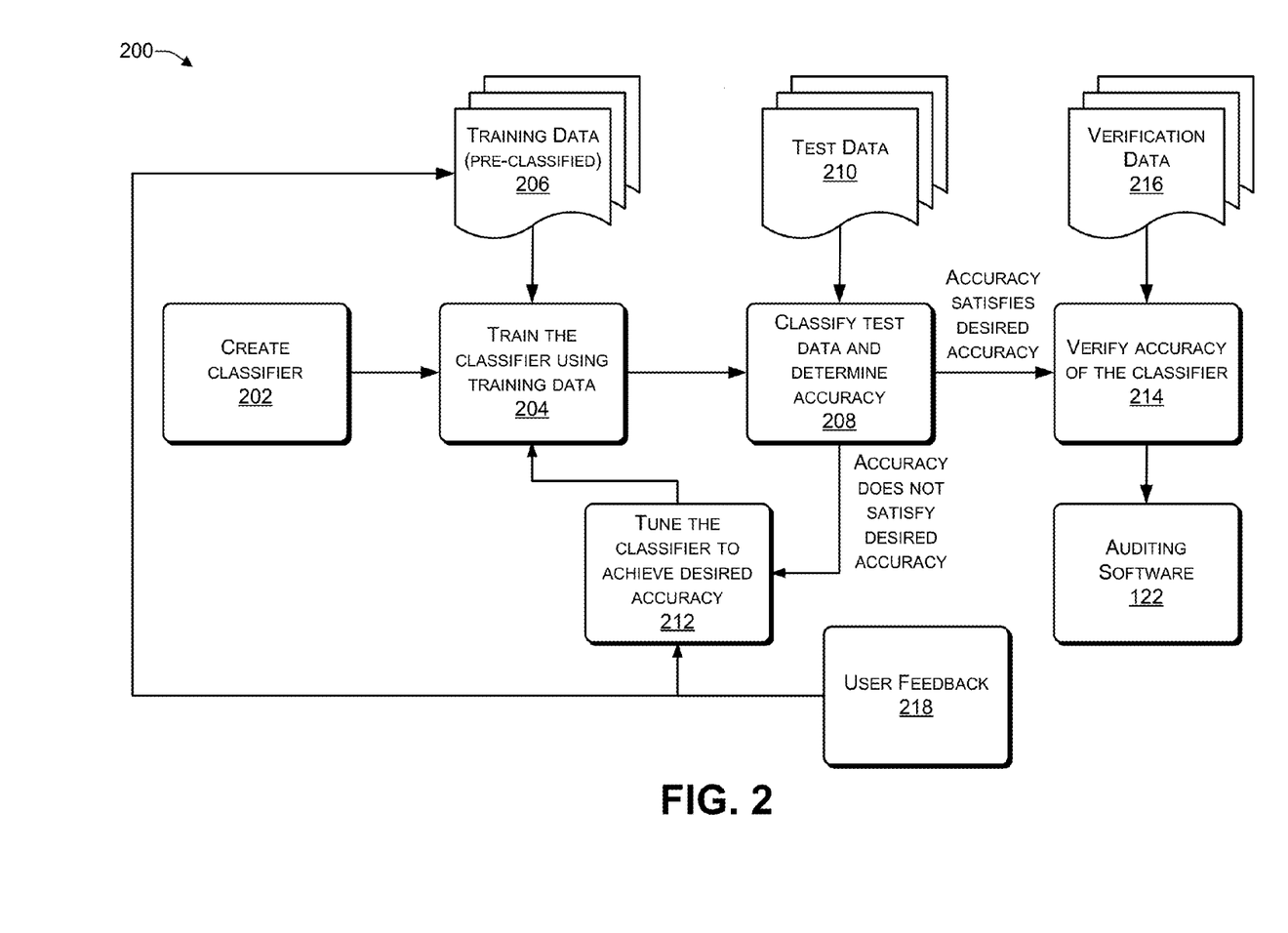
FIG. 2 shows an illustrative process to build and train a classifier.

FIG. 2 shows an illustrative process 200 to build and train a classifier (e.g., the auditing software 122 of FIG. 1). At block 202, the classifier algorithm is created. For example, software instructions that implement one or more algorithms may be written to create the classifier. The algorithms may implement machine learning, pattern recognition, and other types of algorithms, such as a support vector machine, decision trees, ensembles (e.g., random forest), linear regression, naive Bayesian, neural networks, logistic regression, perceptron, or other machine learning algorithm.

At block 204, the classifier may be trained using training data 206. The training data 206 may include event logs, alert profiles, and data associated with event logs and alert profiles that has been pre-classified by a human, e.g., an expert.

At block 208, the classifier may be instructed to classify test data 210. The test data 210 (e.g., event logs, alert profiles, and data associated with event logs and alert profiles) may have been pre-classified by a human, by another classifier, or a combination thereof. An accuracy with which the classifier 144 has classified the test data 210 may be determined. If the accuracy does not satisfy a desired accuracy, at 212 the classifier may be tuned to achieve a desired accuracy. The desired accuracy may be a predetermined threshold, such as ninety-percent, ninety-five percent, ninety-nine percent and the like. For example, if the classifier was eighty-percent accurate in classifying the test data and the desired accuracy is ninety-percent, then the classifier may be further tuned by modifying the algorithms based on the results of classifying the test data 210. Blocks 204 and 212 may be repeated (e.g., iteratively) until the accuracy of the classifier satisfies the desired accuracy. In addition, in some cases, user feedback 218 (e.g., from a system administrator) may be used to further tune the classifier. The user feedback 218 may be added to the training data 206.

When the accuracy of the classifier in classifying the test data 210 satisfies the desired accuracy, at 208, the process may proceed to 214 where the accuracy of the classifier may be verified using verification data 216 (e.g., event logs, alert profiles, and data associated with event logs and alert profiles). The verification data 216 may have been pre-classified by a human, by another classifier, or a combination thereof. The verification process may be performed at 214 to determine whether the classifier exhibits any bias towards the training data 206 and/or the test data 210. The verification data 216 may be data that are different from both the test data 210 and the training data 206. After verifying, at 214, that the accuracy of the classifier satisfies the desired accuracy, the trained classifier 218 may be used to classify event logs, alert profiles, and data associated with event logs and alert profiles. If the accuracy of the classifier does not satisfy the desired accuracy, at 214, then the classifier may be trained using additional training data, at 204. For example, if the classifier exhibits a bias to the training data 206 and/or the test data 210, the classifier may be training using additional training data to reduce the bias.

Thus, the classifier 144 may be trained using training data and tuned to satisfy a desired accuracy. After the desired accuracy of the classifier 144 has been verified, the classifier 144 may be used, for example, to determine which event logs are sufficiently interesting to cause an alert profile to be created, to analyze event logs to determine when to create an alert profile, when to determine that the alert profile is no longer relevant, when to determine to deactivate (or delete) the alert profile, etc.

Figure 3:
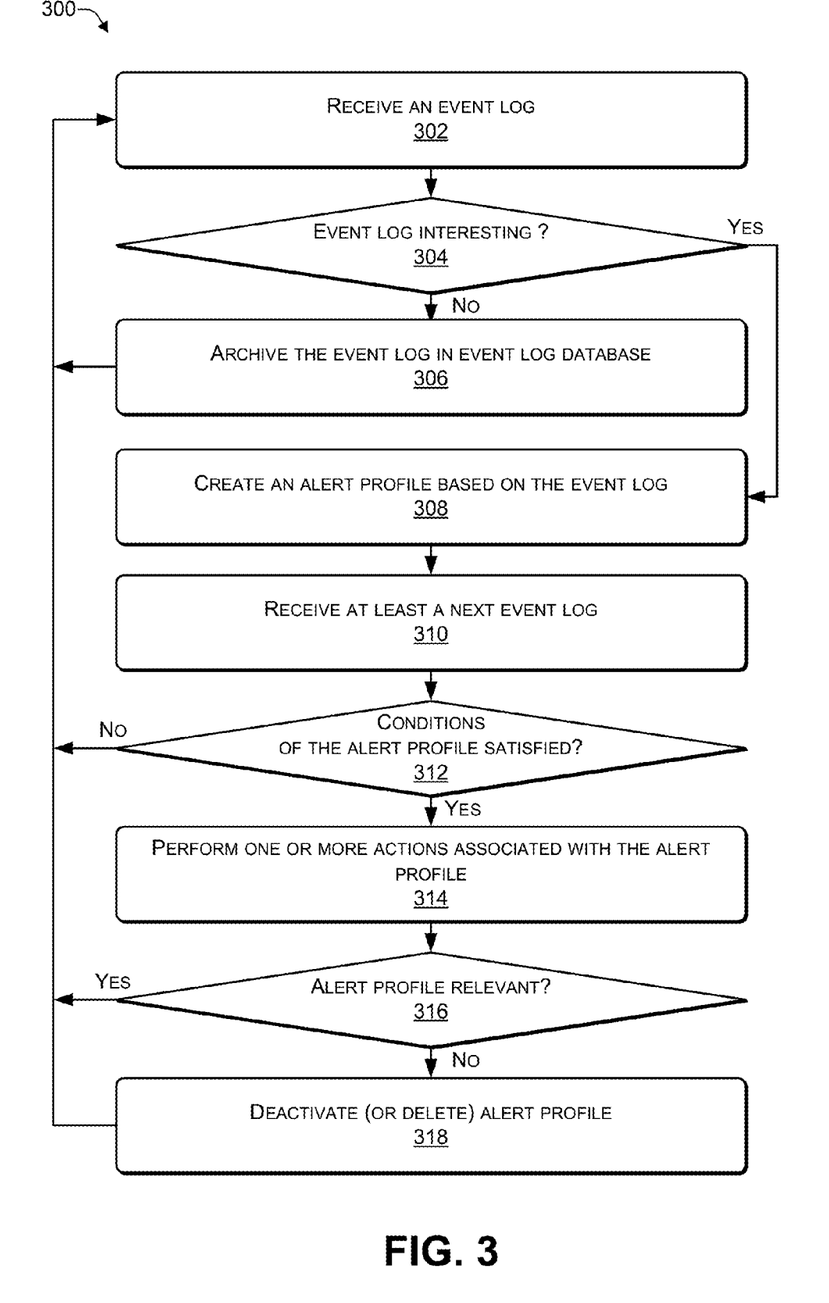
FIG. 3 is a flowchart of a process to determine that an event log comprises an interesting event log according to some embodiments.

FIG. 3 is a flowchart of a process 300 to create an alert profile according to some embodiments. The process 300 may be performed by the auditing software 122 of FIG. 1.

At 302, an event log may be received. At 304, a determination may be made whether the event log is considered interesting. If a determination is made, at 306, that the event log is not considered interesting, then the event log may be archived in an event log database, at 306, and the process may proceed to 302 to wait to receive another event log. For example, in FIG. 1, the auditing software 122 may receive the event log 114(1) and determine whether the event log 114(1) is considered interesting based on one or more criteria. To illustrate, the event log 114(1) may be considered interesting when the event log 114(1) is (i) indicative of malicious activity, (ii) indicative of resource under-utilization or capacity-utilization, (iii) other conditions that are of interest, or any combination thereof. If the auditing software 122 determines that the event log 114(1) is not considered interesting, the event log 114(1) may be stored in the event log database 120 and the auditing software 122 may wait to receive a next event log (e.g., event log 114(Q) where Q=2). Classifying an event log as interesting or not interesting may be performed by a user (e.g., a system administrator), the auditing software 122 (e.g., using a classifier trained using machine learning), or both. For example, the auditing software 122 may classify an event log as interesting and a system administrator may confirm that the event log is interesting or the system administrator may override the auditing system 122 and change the event log to uninteresting. As another example, the auditing software 122 may classify the event log 114(1) as interesting and a system administrator may classify the event log 114(Q) as interesting. The criteria (e.g., rules) used to determine whether the event log is interesting or uninteresting may be based on thresholds, rule engines, or other criteria. For example, to identify event logs associated with malicious activity, the criteria to determine whether an event log is interesting may be based on criteria indicative of malicious activity, such as a number of failed login attempts within a predetermined (e.g., short) period of time occurring at one of the user devices 104, a large number of transactions being processed within a predetermined (e.g., short) period of time by one of the databases 102 or by one of the servers 106. To identify event logs associated with resource utilization, the criteria to determine whether an event log is interesting may be based on criteria indicative of (i) capacity-utilization, e.g., usage (e.g., transactions processed within a predetermined period of time) that falls above a threshold or (ii) under-utilization, e.g., usage that falls at or below the threshold. the auditing software 122 may include a rules engine that executes one or more rules in real time to identify event logs based on predefined rules (e.g., criteria). The rule engine may provide the ability to: register, define, classify, and manage all rules, verify consistency of rule definitions, define relationships between different rules, and relate the rules to applications that are affected or need to enforce one or more of the rules. Locking out a user identifier (ID) after more than a threshold number of failed login attempts is an example of a rule to enforce security.

If a determination is made, at 306, that the event log is considered interesting, then an alert profile may be created based on the event log, at 308, and at least one additional log may be received, at 310. For example, in FIG. 1, the auditing software 122 may receive the event log 114(1) and determine that the event log 114(1) is considered interesting based on one or more criteria (e.g., rules). The auditing software 122 may store the event log 114(1) in the event log database 120 and may create the alert profile 124. For example, the auditing software 122 may receive the event log 114(1), determine that the event log 114(1) is considered interesting based on one or more criteria (e.g., rules), and create the alert profile 124. The auditing software 122 may analyze one or more previously received event logs stored in the event log database 120 (i) after determining that the event log 114(1) is interesting or (ii) as part of the process to determine that the event log 114(1) is interesting. For example, receiving the event log 114(1) may trigger an analysis of a portion of the logs stored in the event log database 120 and the analysis may be used to determine whether the event log 114(1) is interesting and whether to create the alert profile 124.

At 312, a determination may be made as to whether conditions of the alert profile are satisfied. If a determination is made, at 312, that the conditions of the alert profile are not satisfied, then the process may proceed to 302 to receive another event log. If a determination is made, at 312, that the conditions of the alert profile are satisfied, then the process may proceed to 314, where one or more actions associated with the alert profile may be performed. For example, in FIG. 1, the auditing software 122 may determine whether the conditions 126 associated with the alert profile 124 are satisfied and perform the actions 128 associated with the alert profile 124 when the conditions 126 are satisfied. To illustrate, the event log 114(1) may indicate several failed login attempts prior to a successful login attempt and cause the auditing software 122 to create the alert profile 124. The event log 114(Q) may indicate a large number of transactions processed by one of the databases 102 within a short period of time. The auditing software 122 may determine that the event log 114(1) and the event log 114(Q) satisfy the conditions 126 and perform the actions 128, such as sending an alert message to a system administrator, raising an alert on a user interface used to monitor the computer system 100, locking out the user ID associated with the failed login attempts, locking one or more of the databases 102 to temporarily prevent access by a particular user or by all users, etc.

At 316, a determination may be made as to whether the alert profile is relevant. If a determination is made, at 316, that the alert profile is relevant, the process may proceed to 302 to receive another event log. If a determination is made, at 316, that the alert profile is not relevant, the process may proceed to 318, where the alert profile may be deactivated (or deleted), and the process may proceed to 302 to receive another event log. The auditing software 122 may periodically (e.g., at a predetermined interval, in response to a user request, in response to receiving an event log, or the like) determine whether the alert profile 124 is relevant. In some cases, a classifier trained using machine learning may be used to determine a length of time that an alert profile 124 is to remain active, after which the alert profile 124 is deactivated or deleted. For example, archived event logs (e.g., from the event log database 120) and deactivated alert profiles 124 may be used to train a classifier (e.g., as described in FIG. 2) to determine a length of time that an alert profile to remain active.

The length of time that an alert profile remains active may vary based on a severity (or a priority) associated with the alert profile. For example, a low severity alert profile may remain active for a different amount of time as compared to a higher severity alert profile. The severity assigned to a particular alert profile may be used along with a predetermined alert profile time interval (e.g., a length of time determined by the classifier) to arrive at a length of time that an alert profile remains active. For example, the auditing software 122 may analyze event logs and alert profiles archived in the event log database 120 to determine that the archived alert profiles were active for X number of hours. The auditing software 122 may analyze event logs and alert profiles archived in the event log database 120 and may assign an alert profile a severity of Y. The time period (e.g., using the timestamp 130) that an alert profile remains active may be X*Y (e.g., X multiplied by Y). An event log (or logs) of activities that have little or no impact on the computer system 100 of FIG. 1 may be assigned a relatively low severity while an event log (or logs) of activities that have a high impact on the computer system 100 of FIG. 1 may be assigned a relatively high severity. For example, the event log 114(1) identifying one or more read operations of one of the databases 102 may be given a low severity while the event log 114(Q) identifying one or more write (or delete) operations of one of the databases 102 may be given a higher severity. In this example, an alert profile created based on the event log 114(1) may be active for 0.5*X hours (e.g., Y=0.5) and an alert profile created based on the event log 114(N) may be active for 1.0*X hours (e.g., X=1.0). In addition, alert profiles designed to detect common malicious activity may remain active for a relatively long time, or may never expire. In some cases, alert profiles designed to identify resource utilization anomalies (e.g., under-utilization or capacity-utilization of resources) may remain active for a relatively long time. In some cases, the auditing software 122 may not determine whether the alert profile 124 is relevant until after the assigned time period (e.g., X*Y) has expired while in other cases the auditing software 122 may determine whether the alert profile 124 is relevant before the assigned time period (e.g., X*Y) has expired.

In some cases, machine learning may be used to perform an analysis of actions of a human operator (e.g., system administrator). For example, an analysis of a system administrator's actions may be performed to learn (i) which event logs are viewed, (ii) how frequently each event log is viewed, (iii) which alert profiles are created in response to viewing which event logs, (iv) a length of time assigned to an alert profile, (v) a severity assigned to an alert profile, (vi) when an alert profile is no longer considered relevant (e.g., based on determining when the system administrator deactivates an alert profile), etc. Thus, a classifier (e.g., the auditing software 122) may analyze the activities (e.g., viewing event logs, creating alert profiles, deactivating alert profiles, and the like) performed by a system administrator to learn how the system administrator views and responds to events logs. In this way, the auditing software 122 may learn and mimic the actions of the system administrator when receiving the events logs 114, creating the alert profile 124, deactivating (or deleting) the alert profile 124, etc.

The determination, at 316, as to whether a particular alert profile is relevant may be made based on (i) particular event log(s) that caused the alert profile to be created, (ii) event logs(s) in the event log database 120 that were generated before the particular event log(s), (iii) event logs(s) that were generated after the particular event log(s), (iv) alert profile(s) that were created before the particular alert profile, (iv) alert profile(s) that were created after the particular alert profile was created, (v) outages of the network elements 102, 104, or 106, (vi) other data related to the computer system, or any combination thereof. For example, an alert profile created in response to an event identifying several failed login attempts may be determined to be non-relevant if no further events of failed login attempts are received within a predetermined time period.

Thus, if auditing software determines (e.g., based on one or more rules) that an event log is interesting, the auditing software may create an alert profile. If the auditing software determines that conditions specified in the alert profile are satisfied, the auditing software may perform one or more actions specified in the alert profile. The auditing software may periodically determine whether the alert profile is relevant and deactivate (or delete) the alert profile after determining that the alert profile is no longer relevant.

Figure 4:
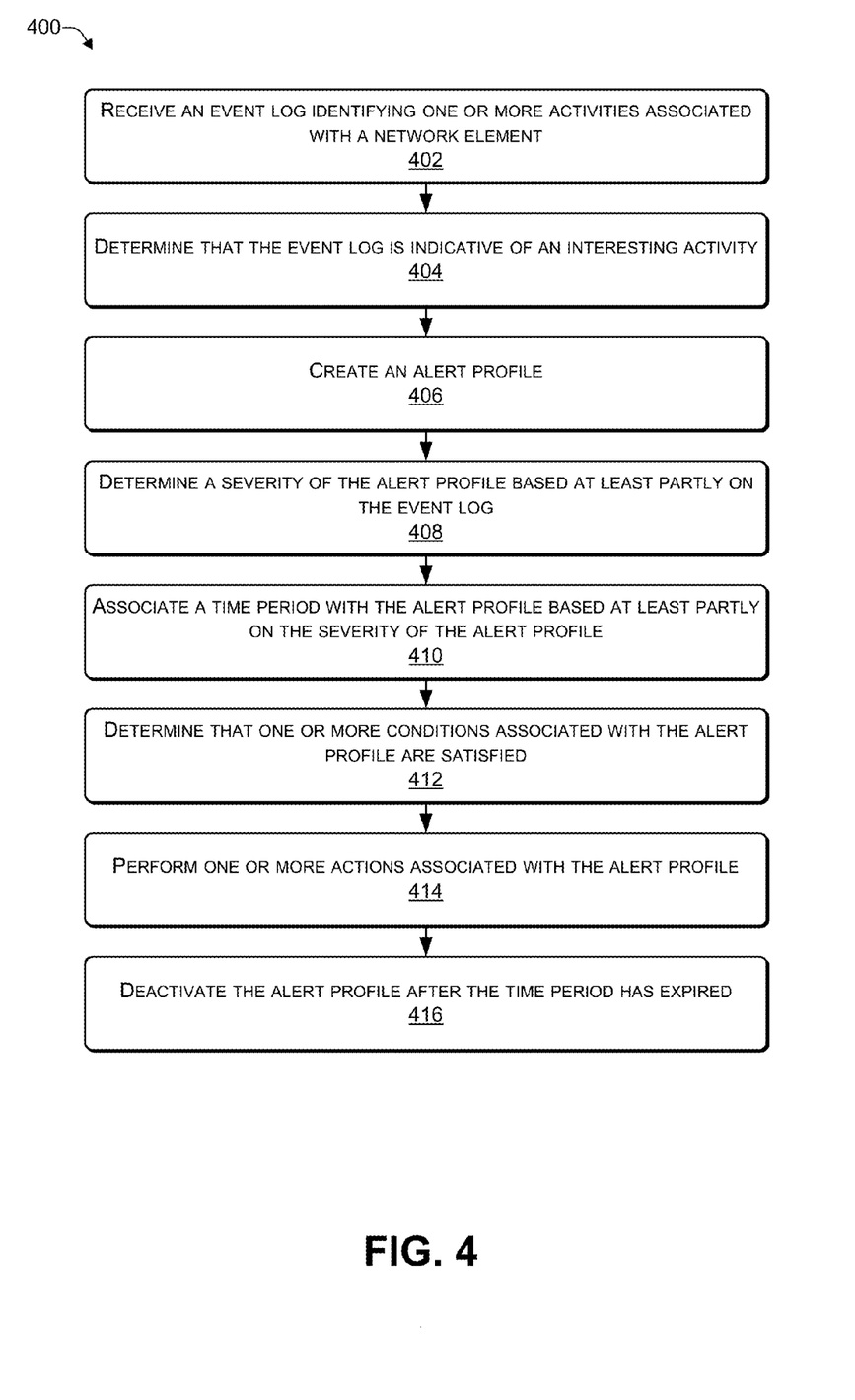
FIG. 4 is a flowchart of a process that includes creating an alert profile according to some embodiments.

FIG. 4 is a flowchart of a process 400 that includes creating an alert profile according to some embodiments. The process 400 may be performed by the central server 116 of FIG. 1.

At 402, an event log identifying one or more activities associated with a network element is received. At 404, a determination is made that the event log is indicative of an interesting activity (e.g., an activity of interest to a system administrator). At 406, an alert profile is created. For example, in FIG. 1, the central server 116 may receive the event log 114(1) and determine that the event log 114(1) is indicative of an interesting activity, such as failed login attempts at one of the user devices 104 or a large number of transactions performed in a short period of time by one of the databases 102 or the servers 106. In response to determining that the event log 114(1) is indicative of an interesting activity, the central server 116 may create the alert profile 124.

At 408, a severity of the alert profile is determined based at least partly on the event log. At 410, a time period is associated with the alert profile based at least partly on the severity of the alert profile. For example, in FIG. 1, the auditing software 122 may determine (e.g., using a classifier) the severity 132 of the alert profile 124 and determine the timestamp 130 based on the severity 132.

At 412, a determination is made that one or more conditions associated with the alert profile are satisfied. At 414, one or more actions associated with the alert profile are performed. For example, in FIG. 1, the auditing software 122 may perform an analysis of archived event logs stored in the event log database 120, monitor additional event logs that are received, such as the event log 114(Q), or both. If the auditing software 122 determines that the conditions 126 of the alert profile 124 are satisfied, the auditing software 122 may perform the actions 128 associated with the alert profile 124, such as alerting a user administrator, locking out a user, blocking traffic to and from a network element, etc.

At 416, the alert profile is deactivated after the time period has expired. The auditing software 122 may periodically determine whether the alert profile 124 is still relevant. For example, after a time period specified by the timestamp 130 has expired, the auditing software 122 may determine whether the alert profile 124 is relevant. If the auditing software 122 determines that the alert profile 124 is relevant, the auditing software 122 may modify the timestamp 130 to extend the time period that the alert profile 124 is active. If the auditing software 122 determines that the alert profile 124 is no longer relevant, the auditing software 122 may deactivate (or delete) the alert profile 124. In some cases, the deactivated alert profile 124 may be archived in the event log database 120.

Thus, a central server may receive event logs generated by agents monitoring activities associated with network elements in a computer system. If the central server determines that one of the event logs is of interest to a system administrator, then the central server may create an alert profile. For example, an event log may be of interest because it may indicate malicious activity or may indicate that a network element is approaching a maximum capacity/throughput of the network element. The central server may perform an analysis of archived event logs, additional event logs received after the event log, or both. If the analysis determines that one or more conditions associated with the alert profile are satisfied, the central server may perform one or more actions. The central server may determine when the alert profile is no longer relevant and deactivate the alert profile. In this way, alert profiles that have are no longer relevant (e.g., outdated) do not remain active in the system to create "noise," e.g., to generate alerts. Otherwise, in a conventional system, alert profiles may be created and may continue to generate alerts even after the alert is no longer relevant.

Figure 5:
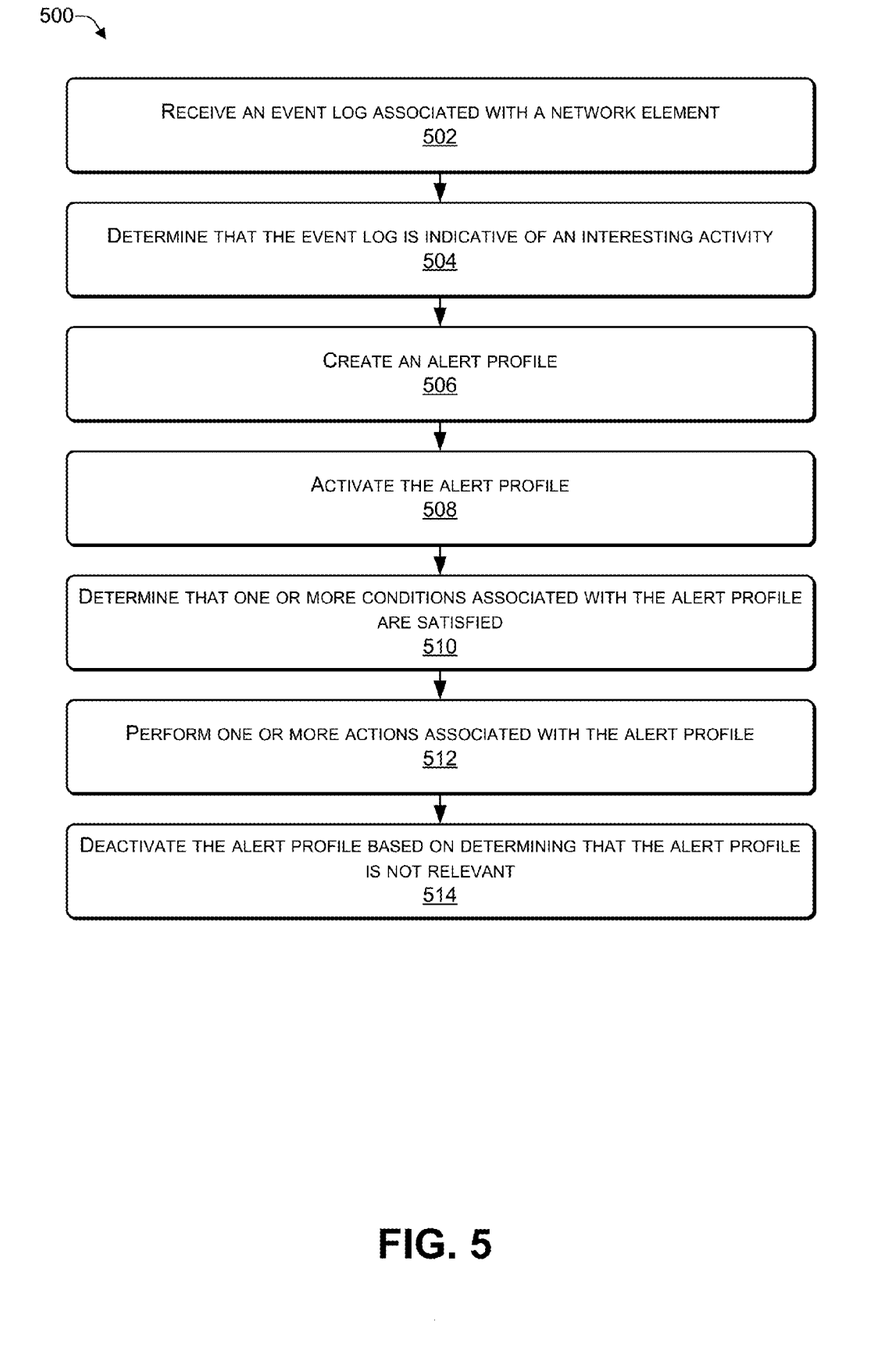
FIG. 5 is a flowchart of a process that includes receiving an event log according to some embodiments.

FIG. 5 is a flowchart of a process 500 that includes receiving an event log according to some embodiments. The process 500 may be performed by the central server 116 of FIG. 1.

At 502, an event log associated with a network element is received. At 504, a determination is made that the event log is indicative of an interesting activity (e.g., an activity of interest to a system administrator). At 506, an alert profile is created. For example, in FIG. 1, the central server 116 may receive the event log 114(1) and determine that the event log 114(1) is indicative of an interesting activity, such as failed login attempts at one of the user devices 104 or a large number of transactions performed in a short period of time by one of the databases 102 or the servers 106. In response to determining that the event log 114(1) is indicative of an interesting activity, the central server 116 may create the alert profile 124.

At 508, the alert profile is activated. At 510, a determination is made that one or more conditions associated with the alert profile are satisfied. At 512, one or more actions associated with the alert profile are performed. For example, in FIG. 1, the auditing software 122 may perform an analysis of archived event logs stored in the event log database 120, monitor additional event logs that are received, such as the event log 114(Q), or both. If the auditing software 122 determines that the conditions 126 of the alert profile 124 are satisfied, the auditing software 122 may perform the actions 128 associated with the alert profile 124, such as alerting a user administrator, locking out a user, blocking traffic to and from a network element, etc.

At 514, the alert profile is deactivated after determining that the alert profile is not relevant. For example, in FIG. 1, the auditing software 122 may periodically determine whether the alert profile 124 is still relevant. If the auditing software 122 determines that the alert profile 124 is relevant, the auditing software 122 may modify the timestamp 130 to extend the time period that the alert profile 124 is active. If the auditing software 122 determines that the alert profile 124 is no longer relevant, the auditing software 122 may deactivate (or delete) the alert profile 124. In some cases, the deactivated alert profile 124 may be archived in the event log database 120.

Thus, a central server may receive event logs generated by agents monitoring activities associated with network elements in a computer system. If the central server determines that one or more of the event logs are of interest to a system administrator, then the central server may create an alert profile. For example, an event log may be of interest because it may indicate malicious activity or may indicate that a network element is approaching a maximum capacity/throughput of the network element. The central server may perform an analysis of archived event logs, additional event logs received after the event log, or both. If the analysis determines that one or more conditions associated with the alert profile are satisfied, the central server may perform one or more actions. The central server may determine when the alert profile is no longer relevant and deactivate the alert profile. In this way, alert profiles that have are no longer relevant (e.g., outdated) do not remain active in the system to create "noise," e.g., to generate alerts. In contrast, in a conventional system, alert profiles may be created and may continue to generate alerts even after the alert is no longer relevant, generating "background noise" (e.g., meaningless alerts) that are ignored.

Figure 6:
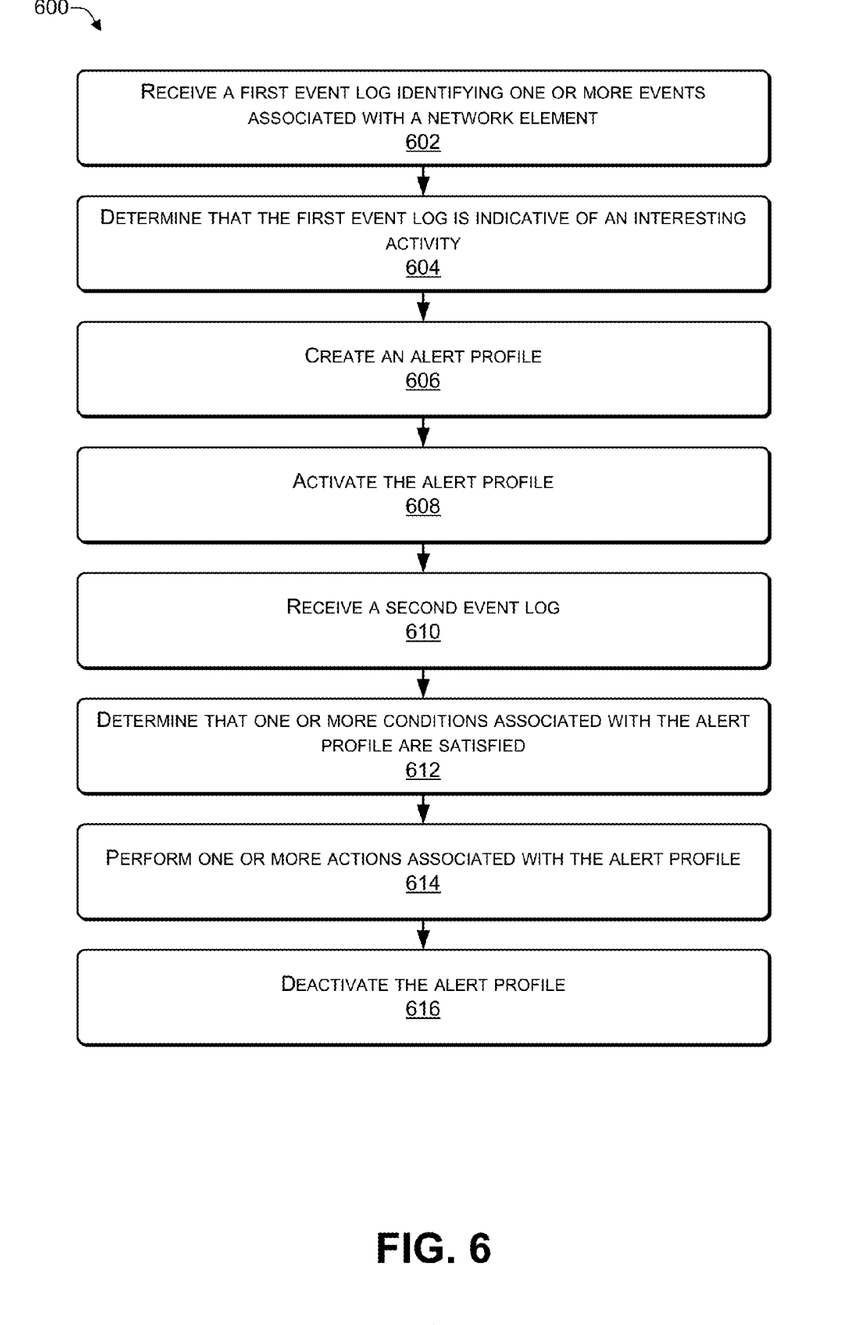
FIG. 6 is a flowchart of a process that includes receiving a first event log and a second event log according to some embodiments.

FIG. 6 is a flowchart of a process 600 that includes receiving a first event log and a second event log according to some embodiments. The process 600 may be performed by the central server 116 of FIG. 1.

At 602, a first event log associated with a network element is received. At 604, a determination is made that the first event log is indicative of an interesting activity (e.g., an activity of interest to a system administrator). At 606, an alert profile is created. At 608, the alert profile is activated. For example, in FIG. 1, the central server 116 may receive the event log 114(1) and determine that the event log 114(1) is indicative of an interesting activity, such as failed login attempts at one of the user devices 104 or a large number of transactions performed in a short period of time by one of the databases 102 or the servers 106. In response to determining that the event log 114(1) is indicative of an interesting activity, the central server 116 may create and activate the alert profile 124.

At 610, a second event log is received. At 612, a determination is made that one or more conditions associated with the alert profile are satisfied. At 614, one or more actions associated with the alert profile are performed. For example, in FIG. 1, the auditing software 122 may perform an analysis of archived event logs stored in the event log database 120, monitor additional event logs that are received, such as the event log 114(Q), or both. If the auditing software 122 determines that the conditions 126 of the alert profile 124 are satisfied, the auditing software 122 may perform the actions 128 associated with the alert profile 124, such as alerting a user administrator, locking out a user, blocking traffic to and from a network element, etc.

At 616, the alert profile is deactivated. For example, in FIG. 1, The auditing software 122 may periodically determine whether the alert profile 124 is still relevant. If the auditing software 122 determines that the alert profile 124 is relevant, the auditing software 122 may modify the timestamp 130 to extend the time period that the alert profile 124 is active. If the auditing software 122 determines that the alert profile 124 is no longer relevant, the auditing software 122 may deactivate (or delete) the alert profile 124. In some cases, the deactivated alert profile 124 may be archived in the event log database 120.

Thus, a central server may receive event logs generated by agents monitoring activities associated with network elements in a computer system. If the central server determines that one of the event logs is of interest to a system administrator, then the central server may create an alert profile. For example, an event log may be of interest because it may indicate malicious activity or may indicate that a network element is approaching a maximum capacity/throughput of the network element. The central server may perform an analysis of archived event logs, additional event logs received after the event log, or both. If the analysis determines that one or more conditions associated with the alert profile are satisfied, the central server may perform one or more actions. The central server may determine when the alert profile is no longer relevant and deactivate the alert profile. In this way, alert profiles that have are no longer relevant (e.g., outdated) do not remain active in the system to create "noise," e.g., to generate alerts. Otherwise, if alert profiles were permanent, alert profiles may continue to generate alerts even after the alert is no longer relevant.

Figure 7:
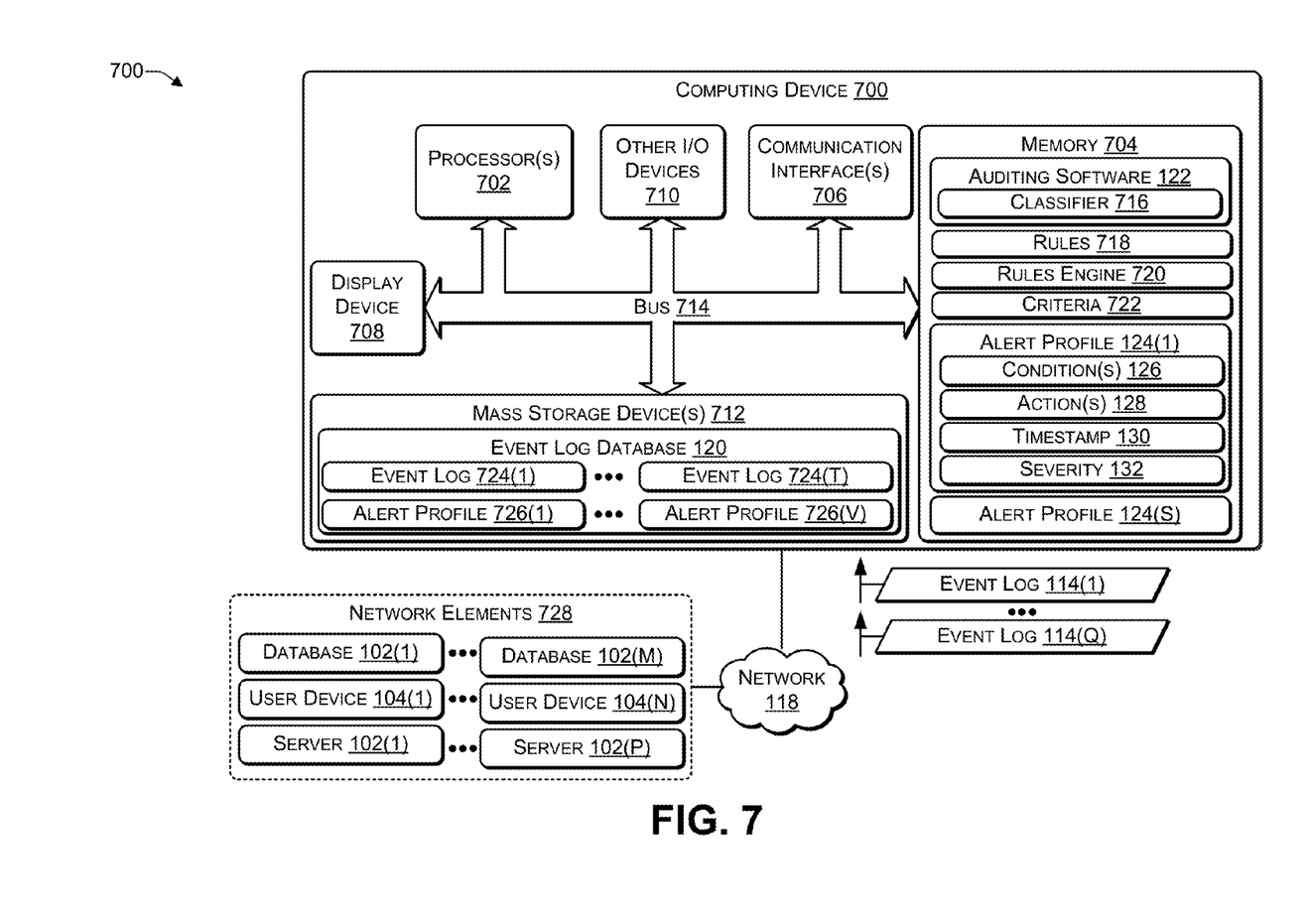
FIG. 7 illustrates an example configuration of a computing device that can be used to implement the systems and techniques described herein.

FIG. 7 illustrates an example configuration of a computing device that can be used to implement the systems and techniques described herein, such as to implement the central server 116 of FIG. 1. The computing device 700 may include at least one processor 702, a memory 704, communication interfaces 706, a display device 708, other input/output (I/O) devices 710, and one or more mass storage devices 712, configured to communicate with each other, such as via a system bus 714 or other suitable connection.

The processor 702 is a hardware device that may include a single processing unit or a number of processing units, all of which may include single or multiple computing units or multiple cores. The processor 702 can be implemented as one or more microprocessors, microcomputers, microcontrollers, digital signal processors, central processing units, state machines, logic circuitries, and/or any devices that manipulate signals based on operational instructions. Among other capabilities, the processor 702 can be configured to fetch and execute computer-readable instructions stored in the memory 704, mass storage devices 712, or other computer-readable media.

Memory 704 and mass storage devices 712 are examples of computer storage media (e.g., memory storage devices) for storing instructions which are executed by the processor 702 to perform the various functions described above. For example, memory 704 may generally include both volatile memory and non-volatile memory (e.g., RAM, ROM, or the like) devices. Further, mass storage devices 712 may generally include hard disk drives, solid-state drives, removable media, including external and removable drives, memory cards, flash memory, floppy disks, optical disks (e.g., CD, DVD), a storage array, a network attached storage, a storage area network, or the like. Both memory 704 and mass storage devices 712 may be collectively referred to as memory or computer storage media herein, and may be a media capable of storing computer-readable, processor-executable program instructions as computer program code that can be executed by the processor 702 as a particular machine configured for carrying out the operations and functions described in the implementations herein.

The computer storage media, such as memory 704 and mass storage devices 712, may be used to store software and data. For example, the memory 704 may be used to store the auditing software 122 of FIG. 1 and one or more alert profiles 124(1) to 124(S) (where S>1). The memory 704 may store one or more rules 718, at least one rules engine 720, and one or more criteria 722. The rules 718 or the criteria 722 may be used to determine whether an event log is interesting or uninteresting may be based on the rule engines 720. For example, to identify event logs associated with malicious activity, the rules 718 or the criteria 722 to determine whether an event log is interesting may be based on rules or criteria indicative of malicious activity, such as a number of failed login attempts within a predetermined (e.g., short) period of time occurring at one of the user devices 104, a large number of transactions being processed within a predetermined (e.g., short) period of time by one of the databases 102 or by one of the servers 106. To identify event logs associated with resource utilization, the rules 718 or the criteria 722 to determine whether an event log is interesting may be based on criteria indicative of (i) capacity-utilization, e.g., usage (e.g., transactions processed within a predetermined period of time) that falls above a threshold or (ii) under-utilization, e.g., usage that falls at or below the threshold. The rules engine 720 may execute one or more of the rules 718 in real time to identify event logs based on the predefined rules 718 or the criteria 722. The rules engine 720 may provide the ability to: register, define, classify, and manage the rules 718 or the criteria 722, verify consistency of definitions of the rules 718, define relationships between different rules 718, and relate the rules 718 to software applications that are affected or need to enforce one or more of the rules 718. An example of one of the rules 718 may include locking out a user identifier (ID) after more than a threshold number of failed login attempts.

The event log database 120 may be used to archive multiple event logs 724(1) to 724(T) and multiple alert profiles 726(1) to 726(V) (where T>1, V>1). The auditing software 122 may perform an analysis of the archived event logs 724 to determine when to create an alert profile. Portions of the archived event logs 724 and alert profiles 726 may be used as the training data 206, the test data 210, the verification data 216, or any combination thereof to train the classifier 716 (e.g., as described in FIG. 2).

The computing device 700 may also include one or more communication interfaces 706 for exchanging data with network elements 728. The communication interfaces 706 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 706 can also provide communication with external storage (not shown), such as in a storage array, network attached storage, storage area network, or the like.

A display device 708, such as a monitor may be included in some implementations for displaying information and images to users. Other I/O devices 710 may be devices that receive various inputs from a user and provide various outputs to the user, and may include a keyboard, a remote controller, a mouse, a printer, audio input/output devices, and so forth.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various embodiments of the method and apparatus of the present invention have been illustrated herein in the Drawings and described in the Detailed Description, it will be understood that the invention is not limited to the embodiments disclosed, but is capable of numerous rearrangements, modifications and substitutions without departing from the scope of the present disclosure.

What is claimed is:

1. A computer-implemented method, comprising:
   receiving, from a software agent, an event log identifying one or more activities associated with a network element;
   determining, by a classifier trained using machine learning, that the event log is indicative of an interesting activity;
   creating, by the classifier, an alert profile based at least partly on the event log;
   determining, by the classifier, a severity of the alert profile based at least partly on the event log;
   determining, by the classifier, a time interval associated with the alert profile;
   determining a time period by multiplying the time interval by the severity of the alert profile;
   associating, by the classifier, the time period with the alert profile; and
   deactivating, by the classifier, the alert profile after the time period has expired.

2. The computer-implemented method of claim 1, wherein the network element comprises at least one of:
   a database hosting device;
   a user computing device; or
   a server device.

3. The computer-implemented method of claim 1, further comprising:
   determining that one or more conditions associated with the alert profile are satisfied; and
   performing one or more actions associated with the alert profile.

4. The computer-implemented method of claim 3, wherein the one or more actions include alerting a system administrator.

5. The computer-implemented method of claim 3, wherein the one or more actions include preventing the network element from performing additional activities or preventing access to the network element.

6. The computer-implemented method of claim 1, wherein deactivating, by the classifier, the alert profile after the time period has expired comprises:
   determining, after the time period has expired, that the alert profile is not relevant based on one or more additional event logs; and
   deactivating the alert profile based at least in part on determining that the alert profile is not relevant.

7. The computer-implemented method of claim 1, wherein determining, by a classifier trained using machine learning, that the event log is indicative of an interesting activity comprises determining that the event log is indicative of at least one of:
   a malicious activity; or
   a utilization of a network resource satisfying a predetermined threshold.

8. One or more non-transitory computer-readable media storing instructions that include a classifier algorithm, the instructions executable by one or more processors to perform operations comprising:
   receiving, from a software agent, an event log associated with a network element;
   determining that the event log is indicative of an interesting activity;
   creating an alert profile based at least partly on the event log;
   determining a severity of the alert profile based at least partly on the event log;
   determining a time interval associated with the alert profile;
   determining a time period by multiplying the time interval by the severity of the alert profile;
   associating the time period with the alert profile; and
   deactivating the alert profile based on determining that the time period has expired.

9. The one or more non-transitory computer-readable media of claim 8, wherein determining that the event log is indicative of the interesting activity comprises:
   determining that the event log is indicative of malicious activity.

10. The one or more non-transitory computer-readable media of claim 8, wherein determining that the event log is indicative of the interesting activity comprises:
    determining that the event log is indicative that a utilization of a network resource is at or above a predetermined threshold.

11. The one or more non-transitory computer-readable media of claim 8, wherein determining that the event log is indicative of the interesting activity comprises:

determining that the event log is indicative that a utilization of a network resource is below a predetermined threshold.

12. The one or more non-transitory computer-readable media of claim 8, further comprising:
receiving one or more additional event logs; and
determining that one or more conditions associated with the alert profile are satisfied based at least partly on the one or more additional event logs.

13. The one or more non-transitory computer-readable media of claim 8, further comprising:
determining that one or more conditions associated with the alert profile are satisfied; and
performing one or more actions associated with the alert profile.

14. A server, comprising:
one or more processors; and
one or more non-transitory computer-readable media storing instructions comprising a classifier trained using machine learning, the instructions executable by the one or more processors to perform operations comprising:
receiving, from a software agent, a first event log identifying one or more events associated with a network element;
determining, by a classifier trained using machine learning, that the first event log is indicative of an interesting activity;
creating, by the classifier, an alert profile based at least partly on the first event log;
activating the alert profile;
receiving at least a second event log;
determining, by the classifier, that one or more conditions associated with the alert profile are satisfied based on the first event log and the second event log;
determining, by the classifier, a severity of the alert profile based at least partly on the first event log and the second event log;
determining, by the classifier, a time interval associated with the alert profile;
determining, by the classifier, a time period by multiplying the time interval by the severity of the alert profile;
associating, by the classifier, the time period with the alert profile;
performing one or more actions associated with the alert profile based on determining that the one or more conditions associated with the alert profile are satisfied; and
deactivating, by the classifier, the alert profile based on determining that the time period has expired.

15. The server of claim 14, wherein determining that the first event log is indicative of an interesting activity comprises:
determining that the first event log is indicative of malicious activity.

16. The server of claim 14, wherein the alert profile comprises the one or more conditions and the one or more actions.

17. The server of claim 14, wherein performing the one or more actions associated with the alert profile comprises:
alerting a system administrator; and
blocking traffic to and from the network element.

18. The server of claim 14, the operations further comprising:
determining a time period to activate the alert profile; and
associating the time period with the alert profile.

19. The server of claim 14, further comprising:
determining that the interesting activity has not occurred for at least a predetermined amount of time.

20. The server of claim 14, further comprising:
determining that an additional event log indicative of the interesting activity has not been received for at least a predetermined amount of time.

* * * * *